June 4, 1946.  P. E. MERCIER  2,401,364
LANDING GEAR WITH DIRIGIBLE LANDING WHEEL
Filed April 17, 1940  4 Sheets-Sheet 1
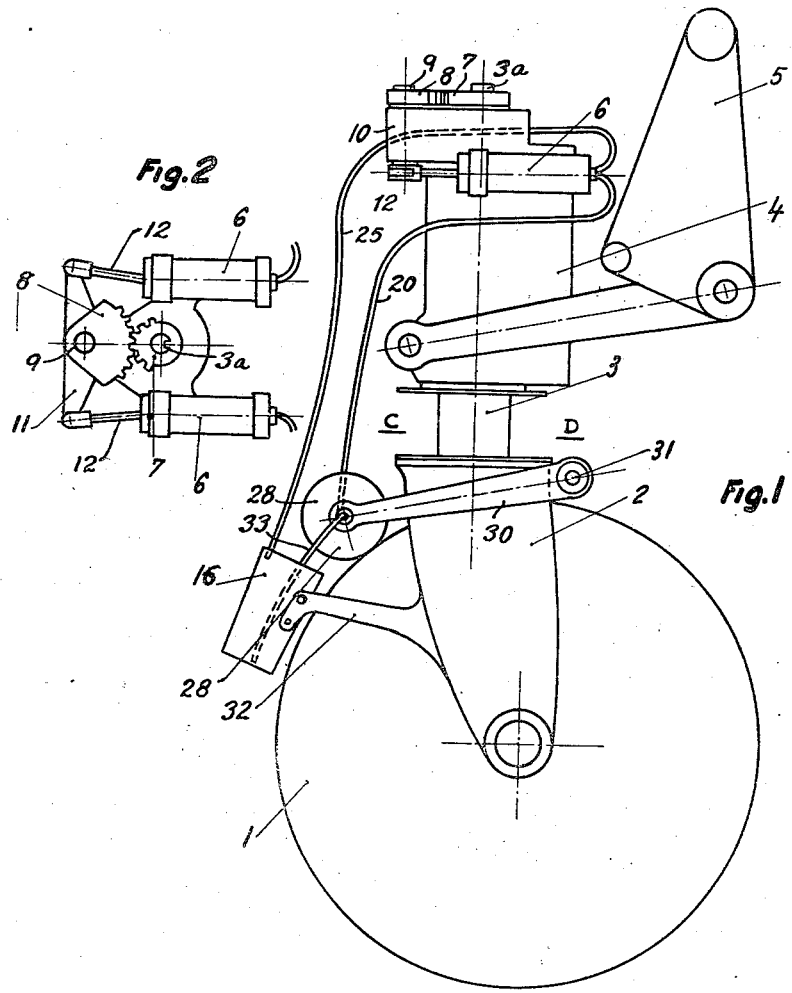
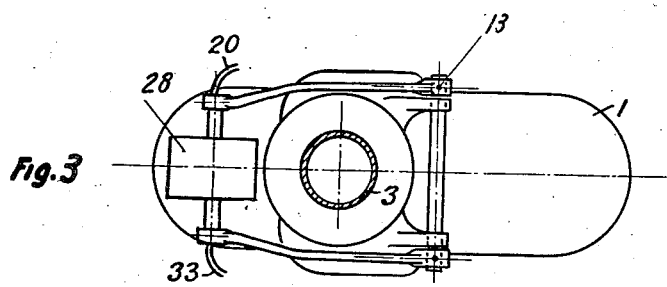
INVENTOR:
PIERRE ERNEST MERCIER
BY: Haseltine, Lake & Co
ATTORNEYS

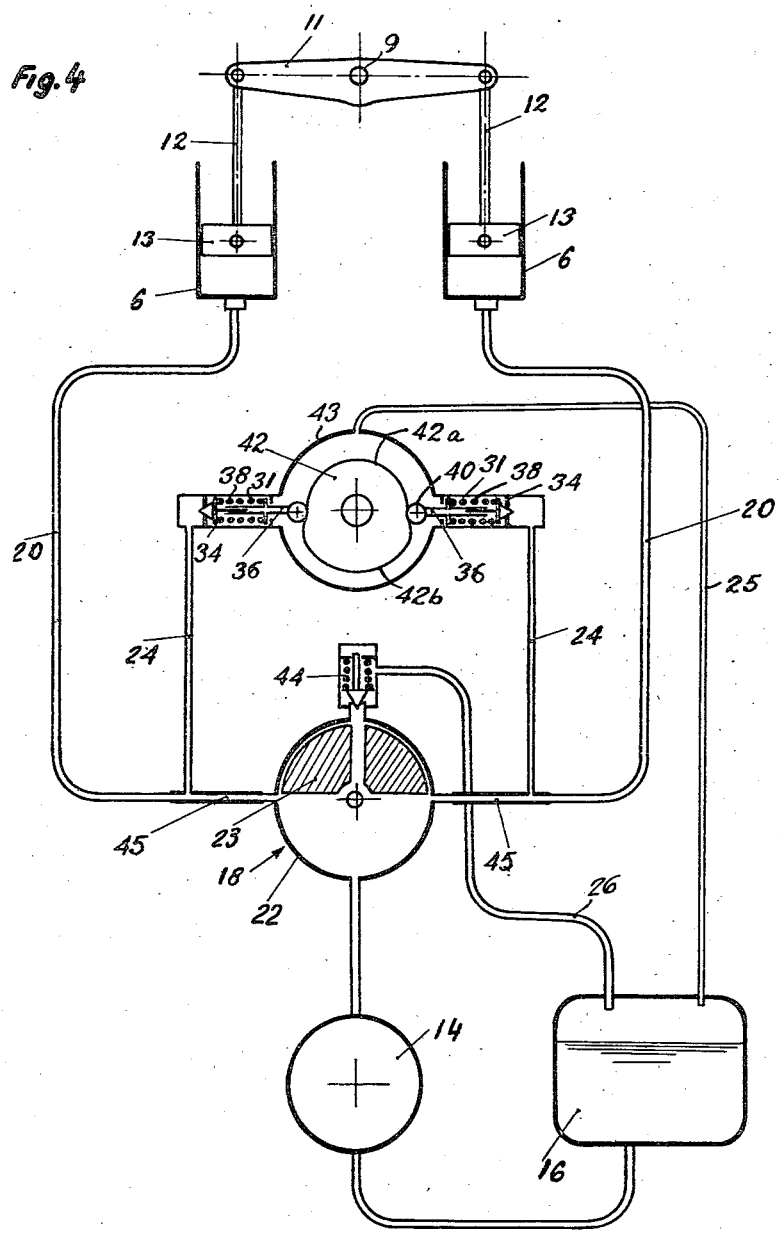

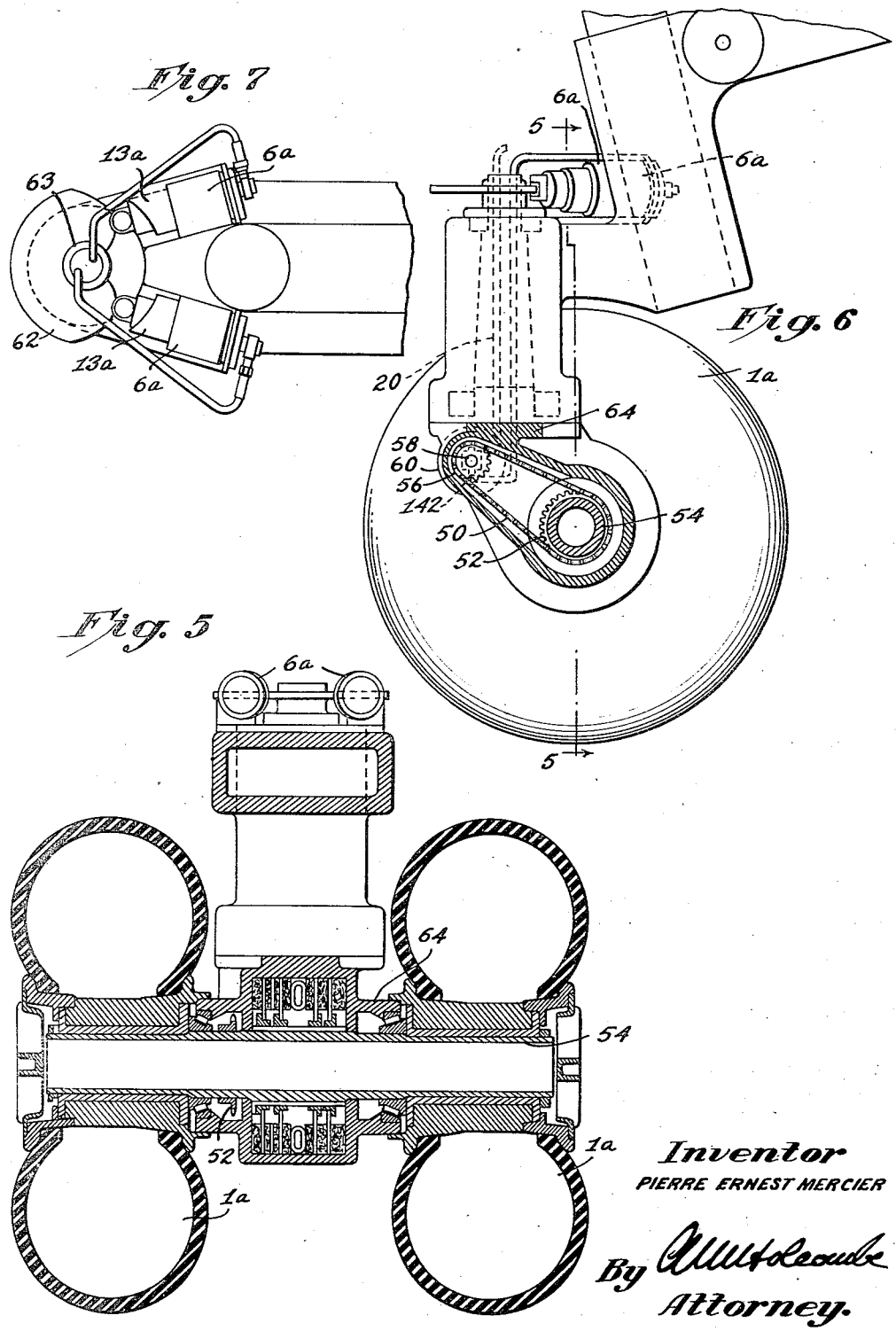

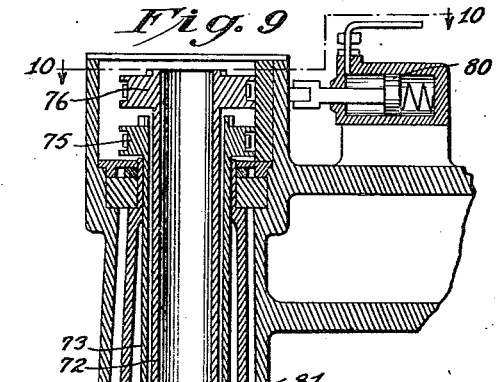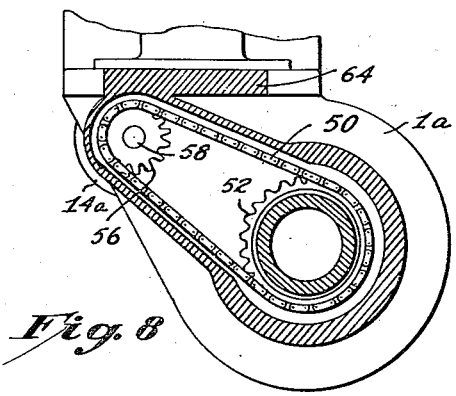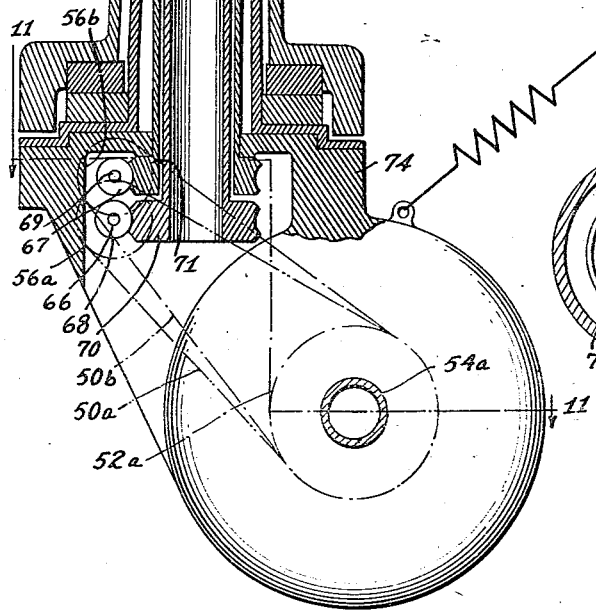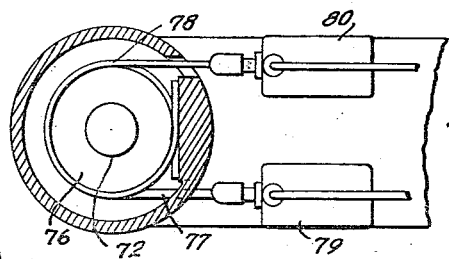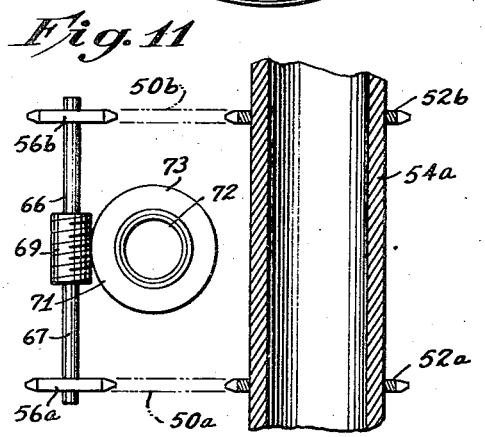

Patented June 4, 1946

2,401,364

UNITED STATES PATENT OFFICE 2,401,364

LANDING GEAR WITH DIRIGIBLE LANDING WHEEL

Pierre Ernest Mercier, Neuilly-sur-Seine, France; vested in the Alien Property Custodian Application April 17, 1940, Serial No. 330,007
In France April 25, 1939

7 Claims. (Cl. 244—50)

This invention relates to improvements in airplane landing gears having steerable landing wheels, and more particularly to a steerable landing gear wherein the power for steering the landing wheel is derived from the rotation thereof.

Airplane landing gears having a steerable landing wheel, and more particularly those of the three-wheeled or tricycle type, possess a number of advantages. Included among these is the greater ease with which the plane may be maneuvered on the ground.

It is generally necessary, however, especially in the case of medium and heavily loaded airplanes, to employ a servo-motor for directing the steerable landing wheel. Heretofore compressed air or a liquid under pressure has been employed to feed such servo-motors and the source of the power, that is, the supply of the compressed air or liquid, under pressure, has been located in the fuselage or wing structure of the airplane and has been recharged or maintained by energy derived from the motors.

It is an object of the present invention to provide, in association with an airplane landing gear, servo means deriving its energy from the rotation of one or more of the landing wheels and transmitting power as required and under control of the pilot at all times to a steerable wheel forming a part of the landing gear assembly.

It is a further object of the invention to provide a servo means powered in the manner above described and associated in a landing gear assembly with means for damping or minimizing sidewise oscillation or "shimmy" of the landing wheels when the airplane is driven in a determined course.

It is a still further object of the invention to provide a servo means operating on hydraulic or pneumatic principles wherein the power supplied to the steerable wheel is maintained within predetermined limits irrespective of the rate or amount of delivery of the power from the rotating wheel to the fluid circulating system.

It is a still further object of the invention to insure that power may not be applied to the landing wheel for steering purposes until the airplane has landed and the steerable wheel is traveling along the ground, thus insuring against inadvertent manipulation of the steerable wheel prior to landing with consequent danger of ground looping or capsizing of the plane when it is traveling at landing speeds.

Still further objects of the invention will become apparent as the description proceeds.

The invention may take a variety of forms; for example, the energy may be taken from the wheel by means of a gear rotatable therewith and connected to another for transmission of the energy thereto. Alternatively, the energy may be taken from the wheel through the intermediary of a roller arranged to bear on the tire of the wheel. The energy thus derived may be used either in the mechanical form in which it has been derived or after transformation into hydraulic or any other form.

A convenient arrangement is one in which, as in one of the particular embodiments of the invention hereinafter described, the directional movements of steerable landing wheels are imparted thereto by a servo-motor which is supplied from a source of energy consisting of a hydraulic pump operable by a roller bearing on the tire of the wheel and which includes two piston and cylinder units, the pistons of which tend respectively to move the wheels in opposite directions when liquid supplied by the pump is directed thereto.

In this arrangement, the installation may conveniently comprise a distributing head for the operating fluid of the pump, which is remotely controlled by the pilot, and a feeding tank for the pump.

The improved landing gear in accordance with this invention may include means for damping the so-called "shimmy" oscillations which often are met with in landing gears having steerable landing wheels.

The invention will now be further described in reference to the accompanying drawings, in which:

Figure 1 is a side elevation of a steerable landing wheel constructed in accordance with the invention together with a part of the movable supporting frame;

Figure 2 is a top plan view with parts omitted, and Figure 3 is a part section and part plan taken on the line C—D of Figure 1;

Figure 4 is a diagrammatic lay-out of the fluid connections and associated parts of a steering control system using the steerable landing wheel as illustrated in Figures 1 to 3;

Figure 5 is a part vertical section and part side elevation on the line 5—5 of Figure 6 with a part of the support omitted;

Figure 6 is a part side elevation and part vertical section and Figure 7 is a plan view of the double wheel and the support therefor illustrated in Figure 5;

Figure 8 is an enlarged sectional view of the wheel and power take-off shown in Figure 6;

Figure 9 is a vertical section through a landing wheel in accordance with this invention employing an entirely mechanical construction as hereinafter described; and Figures 10 and 11 are respectively horizontal sections through Figure 9 on the section lines 10—10 and 11—11 of that figure with parts omitted.

Referring to Figure 1 and its subordinate Figures 2 and 3, wheel 1 is carried by a fork 2 supported by and depending from the shaft 3. This shaft is guided in the body of the dash-pot 4 serving as a wheel carrier. The wheel and its accessories are elements of a retractable landing gear of which the retractable frame 5 is shown.

Mounted adjacent the top of the wheel carrier are a pair of hydraulic cylinders 6.

As shown in Figures 1 and 2, a gear segment 7 is mounted for rotation with a reduced portion 3a of the shaft 3, being rotated therewith by means of a grooved connection as shown in Figure 2 which at the same time permits the shaft 3a to slide vertically with respect to the segment 7 in accordance with the adjustments upward and downwardly of shaft 3 within the dash-pot 4 in absorbing shocks transmitted from the wheel in landing and traveling over rough ground. A toothed sector 8 mounted on a stub shaft 9 carried in an extension 10 of the housing of the dash-pot 4 is associated in meshing engagement with the segment 7.

A lever 11 is secured at its midpoint to the shaft 9 and at its opposite ends to rods 12 connected to the operating pistons 13 of the cylinders 6.

As shown in part in Figures 1 and 3 and in further detail in Figure 4, the cylinders 6 are connected in a liquid circulating system including a hydraulic pump 14, a liquid collecting tank or sump 16, a four-way valve 18, fluid supply pipes 20 extending from the casing 22 of the valve 18 to the respective cylinders, valve controlled by-pass connections 24—25 between the respective supply pipes 20 and the collecting tank 16, and a second by-pass connection 26 from the valve casing 22 to the collecting tank that is operable when the valve 18 is in mid or neutral position and it is desired that the steerable wheel shall be maintained in a straight course.

As shown in Figures 1 and 3, the pump 14 is housed within a roller 28 carried by the arms 30 pivoted at 31 on brackets carried by the fork 2 and is driven through suitable connections by the roller when the latter is brought into driving engagement with the periphery of the wheel 1. The collecting tank 16 is likewise supported by arms 32 from the fork 2 and is connected with the pump by the pipe connection 33.

As shown in Figure 4, return flow of liquid through the connections 24—25 is controlled by valves 34 associated with push rods 36 adapted to reciprocate within the valve chambers 38 and carrying cam followers 40 at their inner ends. Springs 31 acting between abutments on the valves and the push rods urge the cam followers against the periphery of a cam 42 having a low or dwell portion 42a and a high portion or sector 42b. The cam 42 is mounted coaxially with the valve 18 and is movable in coordinated relation therewith under remote control by the pilot. As shown, the cam is mounted within a casing 43 which receives the returning liquid from the connections 24 and discharges it through the connection 25 to the collecting tank.

Flow through the second return connection 26 is controlled by means of the spring pressed valve 44 which is set to permit flow through the pipe 26 in preference to flow through the connections 24—25 when the valve 18 is in its mid or neutral position as shown in Fig. 4.

The operation of the device may be described as follows:

When the airplane is driven along a straight course, the valve 18 and the cam 42 assume the symmetrical positions shown in Figure 4. The pump then delivers liquid through the valve 18 into the tank 16.

The adjustment of the spring tension on the valve 44 is so arranged that the pressure maintained in the liquid supply connections 20 and the cylinders 6 will insure a correct damping of the "shimmy" or tendency to sidewise oscillation of the wheel.

When the pilot wants to produce a turning movement, he causes the simultaneous rotation of the valve member 18 and the cam 42. The liquid discharged from the pump is then admitted to only one of the cylinders 6. The piston 13 of this cylinder is then urged outwardly pivoting the lever 11 and the stub shaft 9 and through the latter rotating the toothed sector 8 and the segment 7, which latter turns the shaft 3a and the wheel 1. Springs, not shown, automatically return the lever 11 to mid or neutral position when the wheel is retracted on take-off.

The pressure that may be applied to the pistons through their cylinders when a turning movement is initiated is determined by pre-adjustment of the tension of the springs operating between the push rods and their corresponding valves. It will be understood that if the liquid flow is directed to one cylinder by manipulation of the valve 18, the cam, which turns to a corresponding extent, will cause the corresponding cam follower 40 to ride up onto the higher portion 42b of the cam, thus increasing the spring tension and consequent resistance to flow of liquid through the corresponding by-pass connection 24 past the valve 34 disposed therein to the return connection 25.

On the other side, the cam being suitably designed, the cam follower 40 travels on the lower or dwell portion 42a of the cam, thus exerting a relatively low spring pressure on the valve 34 associated therewith and permitting liquid to flow past its valve from the corresponding cylinder 6 to the return line 25.

In this manner, the force applied to the wheel in turning is controlled as desired and is a function only of the positions of the controlling parts and it cannot exceed predetermined values, thus insuring continuous operative control of the turning movements and elimination of risk of "ground-looping" or capsizing.

Although the invention has been described in Figures 1–4 as applied to a single steerable wheel, it will be understood that it is applicable to landing gears embodying two wheels mounted for rotation together on a single shaft. Such double wheel constructions have the advantage that they automatically insure damping or minimizing of "shimmy" oscillations independently of the damping action that may be obtained by maintained balanced fluid pressures in the opposed hydraulic cylinders as described above. The association of a double wheel construction in a landing gear of the present invention is particularly desirable when the transmission of the turning force is effected entirely by mechanical means as shown, for example, in the modification of Figures 9–11.

In Figures 5-8 inclusive there is shown a modified form of the invention wherein the power take-off from the rotating double wheel 1a is effected by means of a transmission chain 50 driven by a sprocket 52 mounted on the shaft 54 which carries the wheel 1a. The transmission chain drives a sprocket 56 mounted on the pump shaft 58. The pump 14a is shown as carried within the lower end of the housing 60 of the wheel support.

As shown more particularly in Figure 7, the pistons 13a of the opposed cylinders 6a are connected on opposite sides of the vertical axis of the wheel support to a sector plate 62 which is connected to and rotatable with the hollow shaft 63 supporting the wheel mounting 64. Liquid supply connections 20 are provided between the pump 14a and the cylinders 6a. Valve controlled by-pass connections, not shown, similar to those shown in Figure 4, are also provided.

Figures 9, 10 and 11 illustrate a further embodiment of the invention wherein the directional control is effected entirely through mechanical means. Power is taken from the shaft 54a by means of the driving sprockets 52a and 52b and transmission chains 50a and 50b respectively which in turn drive the sprockets 56a and 56b mounted on shafts 66 and 67 carrying worms 68 and 69. The worms 68 and 69 are driving engagement respectively with the worm gears 70 and 71 mounted on the centrally arranged hollow shafts 72 and 73 which are supported within the swivel mounting 74. At their opposite ends the shafts 72 and 73 carry brake pulleys 75 and 76 which respectively engage brake bands 77 and 78. The brake bands are connected for remote control by the pilot by any suitable means, as for example by means of hydraulic spring jacks 79 and 80 as shown in Figures 9 and 10.

The turning angle of the swivel mounting with respect to the support 81 may be limited by suitable stops, not shown.

Although those embodiments of the invention employing a fluid circuit system have been described with particular reference to the use of a liquid as the fluid circulating medium, it will be understood that compressed air or other pneumatic means may be employed. It will also be understood that the above described embodiments of the invention are illustrative only and that the invention may be applied in many other ways and take different forms from those illustrated. The invention is not to be deemed as limited, therefore, otherwise than as indicated by the appended claims.

What I claim as my invention and desire to secure by Letters Patent of the United States is:

1. In an aircraft landing gear, the combination of a support secured to the aircraft, a wheel unit swiveling in said support and including a landing wheel for the aircraft, a pair of cylinder-piston units operatively connected in opposed relationship between said support and said wheel frame to exert opposed torques to said wheel frame, means including a pump driven by said landing wheel for supplying fluid to said cylinders, manually controlled valve means to selectively control the supplying of fluid to said cylinders thereby to control the swiveling of said wheel frame, a by-pass cam operatively connected to be operated simultaneously with the operation of said valve means, valve conduit means having valves therein associated respectively with the supply of fluid to each of said cylinders, each of said valves being adapted when open to provide a by-pass from the respective cylinders to the fluid supply, and cam follower means connected with said valves and riding on said cam whereby said valves are controlled by the turning of said cam, the apparatus including spring means exerting spring pressure between said cam follower means and each of said valves whereby the cam is operated to shift the cam follower means and thereby vary the spring pressure on said valves.

2. In an aircraft landing gear, the combination of a support secured to the aircraft, a wheel frame pivotally mounted on said support and including a pivot shaft and a landing wheel for the aircraft which is mounted on said shaft, a pair of cylinder-piston units mounted in opposed relationship between said wheel frame and said support to exert opposed pivotal torques on said wheel frame, a hydraulic pump operatively connected to said landing wheel to be operated by the rotation of the landing wheel, conduit means connecting said hydraulic pump to said cylinders, valve means in said conduit means to control the supplying of liquid to said cylinders, a cam operated simultaneously with the operation of said valve means, and means operatively connected with said valve means and with said cam whereby the liquid supplied to said cylinders is controlled with the result that the pivoting of the wheel frame is regulated.

3. In an aircraft landing gear, the combination of a support secured to the aircraft, a wheel frame pivotally mounted on said support and including a pivot shaft and a landing wheel for the aircraft, a pair of cylinder-piston units each of which comprises a cylinder and a piston therein, said units being mounted in opposed relationship between said wheel frame and said support to exert opposed pivotal torques on said wheel frame, a fluid pump means operatively connected to said landing wheel to be operated by the rotation thereof, conduit means connecting said pump means to supply fluid under pressure to said cylinders, valve means in said conduit means to control individually the supplying of fluid to said cylinders whereby the opposed pivotal torques are controlled, a rocking member mounted adjacent said shaft and connected at its ends to the respective ends of said cylinder-piston unit the other end of each of which is connected to said support, a gear segment rigidly mounted with respect to said rocking member, and gear means mounted on said shaft and meshing with said gear segment whereby rocking movement which is transmitted to said rocking arm by said units is transmitted through said gear segment to said gear means and thence to said shaft.

4. In an aircraft landing gear having a steerable wheel carried by a wheel supporting unit, a shaft connected to said unit and rotatable to steer said wheel, steering means including cams secured to said shaft and located on opposite sides of a plane passing through said shaft, cylinders having pistons movable therein and engaging said cams, means driven by said wheel for supplying fluid to said cylinders, and manually operable means controlling the flow of fluid to said cylinders.

5. In an aircraft landing gear in which a support is secured to the aircraft and a landing wheel assembly is mounted on said support for pivotal movements about a vertical axis, in combination, a pair of cylinder-piston units mounted in opposed relation for exerting opposed pivotal torques on said landing wheel assembly in response to fluid pressures applied within said cylinders, a fluid circulating pump driven by a landing wheel forming a part of said assembly, conduits establishing fluid flow connections between said pump and said cylinders, valve means for selectively controlling the supply of fluid to said cylinders and thereby regulating the steering torques exerted by said cylinder-piston units, and means for controlling the turning movements of said assembly including a cam operable simultaneously with said valve means for controlling the return flow of fluid from said cylinder-piston units to said pump.

6. In an aircraft landing gear in which a support is secured to the aircraft and a landing wheel assembly is pivoted on said support for swivelling movements in the steering of the aircraft, in combination, a pair of cylinder-piston units each of which is formed by a cylinder and a piston therein, said units being mounted in opposed relationship for exerting opposed pivotal torques on said landing wheel assembly in response to the relative fluid pressures effective within said cylinders, a pump driven by a roller pivotally mounted for frictional engagement with the periphery of a landing wheel forming a part of said assembly, conduit connections between said pump and said cylinders whereby fluid is supplied under pressure by said pump to said cylinders, and means to selectively control the fluid supplied to each of said cylinders and thereby regulate the relative steering torques exerted by said cylinder-piston units.

7. In an aircraft landing gear in which a support is secured to the aircraft and a landing wheel assembly is mounted on said support for pivotal movements about a vertical axis, in combination, a pair of cylinder-piston units mounted in opposed relation for exerting opposed pivotal torques on said landing wheel assembly in response to fluid pressures applied within said cylinders, a fluid circulating pump driven by a landing wheel forming a part of said assembly, conduits establishing fluid flow connections between said pump and said cylinders, valve means operable to establish fluid flow connections from said pump to said cylinders selectively or simultaneously as desired, and means operable when said valve is positioned to permit fluid flow to both of said cylinders, for resiliently urging said wheel into alignment with the axis of the aircraft, said means including a conduit establishing a fluid flow by-pass between said valve and said pump and a pressure relief valve controlling fluid flow through said by-pass.

PIERRE ERNEST MERCIER.